(12) United States Patent
Gong et al.

(10) Patent No.:  US 12,587,493 B2
(45) Date of Patent:  Mar. 24, 2026

(54) GENERATIVE MACHINE LEARNING MODEL FOR PERSONALIZED KNOWLEDGE SESSION CONTENT

(71) Applicant: Cisco Technology, Inc., San Jose, CA (US)

(72) Inventors: Qixu Gong, Santa Clara, CA (US); Benjamin L. Chang, Saratoga, CA (US); Qihong Shao, Clyde Hill, WA (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/400,503

(22) Filed: Dec. 29, 2023

(65) Prior Publication Data

US 2025/0219968 A1     Jul. 3, 2025

(51) Int. Cl.
*H04L 51/02*      (2022.01)
*G06N 20/00*      (2019.01)

(52) U.S. Cl.
CPC ............. *H04L 51/02* (2013.01); *G06N 20/00* (2019.01)

(58) Field of Classification Search
CPC ......... H04L 51/02; H04L 51/22; H04L 51/28; G06N 20/00; G06F 10/166; G06F 3/0482
USPC ....................................................... 709/206
See application file for complete search history.

(56) References Cited

U.S. PATENT DOCUMENTS

| | | | |
|---|---|---|---|
| 9,098,813 B1 | 8/2015 | Konig et al. | |
| 2014/0156681 A1 | 6/2014 | Lee et al. | |
| 2015/0081611 A1 | 3/2015 | Shivakumar | |
| 2019/0281001 A1* | 9/2019 | Miller | H04L 51/42 |
| 2020/0005196 A1 | 1/2020 | Cai et al. | |
| 2022/0222703 A1 | 7/2022 | Lagi et al. | |
| 2022/0343250 A1* | 10/2022 | Tremblay | G06F 3/0482 |
| 2024/0135088 A1* | 4/2024 | Saha | G06F 40/289 |

OTHER PUBLICATIONS

Li, et al., "Template-based Recruitment Email Generation for Job Recommendation," Proceedings of the 2nd Workshop on Natural Language Generation, Evaluation, and Metrics (GEM), Dec. 7, 2022, 9 pages.

(Continued)

*Primary Examiner* — Glenford J Madamba
(74) *Attorney, Agent, or Firm* — Edell, Shapiro & Finnan, LLC

(57)          ABSTRACT

A method, computer system, and computer program product are provided for generating personalized knowledge session content using a generative machine learning model. User profile data of a plurality of users and service description data that is descriptive of a service are processed to assign the plurality of users to a plurality of user groups. A personalized message is generated for each user group based on the user profile data and the service description data, wherein the personalized message is generated using one or more machine learning models. Each personalized message is provided to each user group and feedback data is collected based on the providing of each personalized message. Based on analyzing of the feedback data, one or more of: the user profile data, the one or more machine learning models, and the service description data are updated.

20 Claims, 7 Drawing Sheets

(56)     References Cited

OTHER PUBLICATIONS

Choi, et al., "Identifying machine learning techniques for classifi-
cation of target advertising," ICT Express 6, Jun. 2020, 6 pages.
Zheng, et al., "Generative Job Recommendations with Large Lan-
guage Model," arXiv:2307.02157v1, https://arxiv.org/pdf/2307.
02157.pdf, Jul. 2023, 10 pages.
Fan, et al., "Blogger-Centric Contextual Advertising," Expert Sys-
tems with Applications, vol. 38, Issue 3, Mar. 2011, 12 pages.
Hou, et al., "Classifying advertising video by topicalizing high-level
semantic concepts," Multimedia Tools and Applications, vol. 77,
Mar. 2018, 37 pages.

* cited by examiner

CONTROL
LOGIC

720

714
I/O

STORAGE

706

710
NETWORK
PROCESSOR
UNIT(s)

712
I/O

I/O

MEMORY
ELEMENT(s)

704

708

PROCESSOR(s)

702

700

GENERATIVE MACHINE LEARNING MODEL FOR PERSONALIZED KNOWLEDGE SESSION CONTENT

TECHNICAL FIELD

The present disclosure relates generally to generative machine learning models, and more specifically, for using such models for generating personalized knowledge session content.

BACKGROUND

Software as a Service (SaaS) is a computing model in which software applications are typically hosted by third-party providers and made available to users over a network, eliminating the need for individual installations and allowing access from any location. New features may be added to SaaS applications over time to enhance the software; as a result, users may need additional training to learn about the new features. In addition, there will be new SaaS services that users may want to explore in the future to enhance their overall workflow. A significant challenge arises in effectively educating and engaging users to ensure the adoption of new features. Conventional methods of feature announcement typically involve manual creation, by a domain expert, of knowledge session content, as well as requests to invite participants to said knowledge sessions. This manual generation results in generic messages that do not consider the various interests, roles, and habits of users. Designing educational materials that cater to both novice and advanced users can also be challenging.

DETAILED DESCRIPTION

Overview

Figure 1:
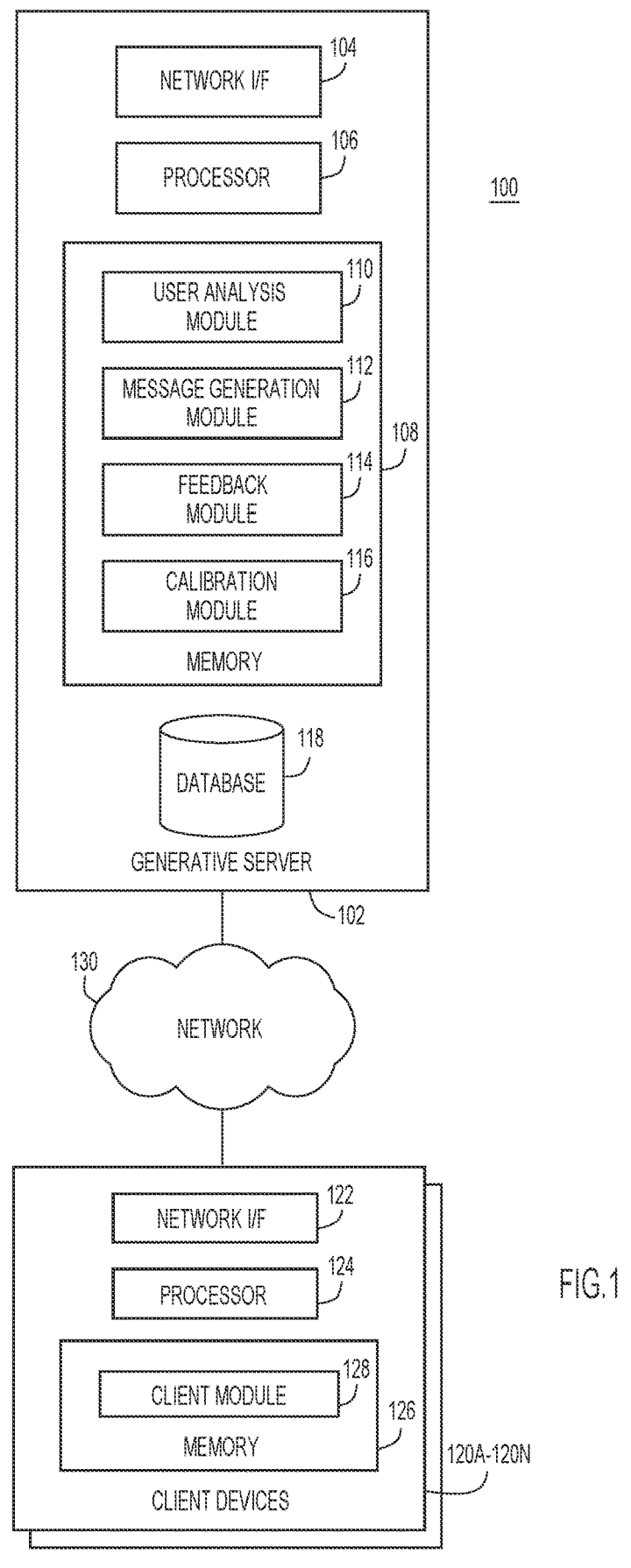
FIG. 1 is a block diagram depicting a network environment for generating personalized knowledge session content using generative machine learning models, according to an example embodiment.

According to one embodiment, techniques are provided for generating personalized knowledge session content using a generative machine learning model. User profile data of a plurality of users and service description data that is descriptive of a service are processed to assign the plurality of users to a plurality of user groups. A personalized message is generated for each user group based on the user profile data and the service description data, wherein the personalized message is generated using one or more machine learning models. Each personalized message is provided to each user group and feedback data is collected based on the providing of each personalized message. Based on analyzing of the feedback data, one or more of: the user profile data, the one or more machine learning models, and the service description data are updated.

Example Embodiments

Present embodiments relate to generative machine learning models, and more specifically, for providing generative machine learning models that generate customized knowledge session content.

When a new computing service (e.g., software as a service (SaaS)) becomes available, or a new feature is added to a service, the provider of the service may seek to make users aware of the new capabilities that are offered by the service. In some cases, the provider may offer training to users so that the users can learn how to effectively integrate and use the new software into their workflows. In conventional approaches, a general invitation may be sent to a group of prospective users that is generic with respect to the interests and needs of those users. Thus, users may simply ignore the invitation and consequently, fail to learn about new features that would enhance their workflow. A conventional solution to this is to manually draft multiple targeted invitations for users. However, this approach is time-consuming and labor-expensive, and can be wholly insufficient in practice when there is an increasing number of new features, as well as an ever-changing population of potential users and interests or requirements of those users.

To address this problem, the embodiments presented herein provide an improved approach to the generation of customized knowledge session content that employs an end-to-end, fully automated process for providing users with personalized content via the use of generative machine learning models. In particular, service description data (i.e., data that describes features of a service (e.g., SaaS)) is processed along with user profile data to group users into subsets based on commonalities between the users, and customized messages can be generated for each subset. User profile data can be analyzed to provide user personals, which are profiles that indicate particular interests and requirements of users, along with their roles, historical behavior, contracts and licenses with which the users are involved, and the like, in order to identify which users would be interested in which features of a service so that the users can be grouped accordingly. Feedback that describes user engagement with the customized messages can be obtained and analyzed to refine various features of the generative machine learning model(s) employed, as well as the user profile data and the service description data itself.

Thus, present embodiments improve the technical field of generative machine learning models by generating personalized knowledge session content and processing feedback in a manner that provides a fully-automated, self-improving approach. The techniques presented herein improve the functionality of the machine learning models by continuously calibrating the models for specific applications in order to improve the accuracy of content generated by the models over time. Thus, present embodiments provide the practical application of improving model accuracy, increasing user engagement, and increasing the efficiency of computing resource utilization (e.g., processing resources, memory resources, storage resources) by focusing those computing resources on the users who are most likely to utilize the computing services, thereby reducing the amount of computing resources that are unnecessarily consumed.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

With reference now to FIG. 1, a block diagram is presented depicting a network environment 100 for generating personalized knowledge session content using generative machine learning models, according to an example embodiment. As depicted, network environment 100 includes a generative server 102 and a plurality of client devices 120A-120N that are in communication via a network 130. It is to be understood that the functional division among components have been chosen for purposes of explaining various embodiments and is not to be construed as a limiting example.

Generative server 102 includes a network interface (I/F) 104, at least one processor (computer processor) 106, memory 108 (which stores instructions for a user analysis module 110, a message generation module 112, a feedback module 114, and a calibration module 116), and a database 118. In various embodiments, generative server 102 may include a rack-mounted server, laptop, desktop, smartphone, tablet, or any other programmable electronic device capable of executing computer readable program instructions. Network interface 104 may be a network interface card that enables components of generative server 102 to send and receive data over a network, such as network 130. Generative server 102 may generate personalized messages for users to utilize services and/or to participate in knowledge sessions regarding services.

User analysis module 110, message generation module 112, feedback module 114, and calibration module 116 may include one or more modules or units to perform various functions of the embodiments described below. User analysis module 110, message generation module 112, feedback module 114, and calibration module 116 may be implemented by any combination of any quantity of software and/or hardware modules or units, and may reside within memory 108 of generative server 102 for execution by a processor, such as processor 106.

User analysis module 110 may analyze user profile data in combination with service description data in order to assign users into groups for which personalized messages may be generated in accordance with present embodiments. User analysis module 110 may obtain user profile data that describes any qualitative and/or qualitative aspects of users, including historical user behavior, contracts and licenses associated with users, usage of particular services or features thereof by the users, and/or other data. The historical user behavior can include examples of customized messages, as generated according to embodiments presented herein, to which users responded or did not respond. Additionally or alternatively, historical user behavior can include user attendance records for training sessions for services to which the user has been invited, user click-through rates of links embedded in customized messages, user dwell time on customized messages, user mouse movements in relation to content in customized messages, and the like. The contracts and licenses used associated with a user may include any subscription details relating to services offered by any provider, details on the number of licenses used by users, active clients, and/or any restrictions or permissions associated with each license. The usage of particular services or features by users may include feature adoption details (e.g., data on which features or modules of the applications users are actively using or have used in the past), service-level metrics (e.g., details related to the performance and/or availability of specific services or functionalities within service platforms), security requirements by users, and the like. Additionally or alternatively, the user profile data can include biographical details relating to users, such as the users' role(s) in an organization (e.g., whether a user is a developer, user experience or user interface designer, project manager, quality assurance engineer, data scientist, security analyst, etc.). The user profile data may also include data describing a network of the user, such as time-series data describing the network status, data describing the topology of a network, data describing the specific physical and/or software computing and/or networking elements of a user's network, and the like.

Service description data may also be provided to user analysis module 110 in order for user analysis module 110 to assign users into groups for the purpose of generating customized messages regarding a service. The service description data can include specifications, software bills of material, scripts, code, slides, nodes, and/or any other structured or unstructured data describing a particular service.

User analysis module 110 may employ one or more machine learning models to process the user profile data in order to assign users to groups. Initially, the user profile data and the service description data are processed to generate embeddings in a vector space representation. Then, a machine learning model such as a neural network or other model can be applied to perform semantic analysis using the embeddings of the service description data in combination with the embeddings of the user profile data in order to assign users into n groups based on similarities between the users (as determined according to the embeddings of the user profile data). In various embodiments, the number of groups may be a predetermined number, or can be based on the number of features of a service (e.g., a service may have five features, so users may be assigned into five groups, and/or a service may have three new features, so users may be assigned into three groups).

User analysis module 110 may also rank the groups according to a predicted interest that the users in each group may have in the service. Groups can be ranked based on the degree to which the user profile data of group members matches the service description data (e.g., using a similarity measure such as cosine similarity in a vector space representation).

Message generation module 112 may generate personalized messages for each group of users based on the service description data and the specific features of each group of users. In order to generate personalized messages, message generation module 112 may employ one or more machine learning models. In some embodiments, message generation module 112 employs one or more large language models that are trained on volumes of text in order to perform text generation. The large language model(s) can be based on transformer machine learning models and can be fine-tuned for particular downstream tasks, such as generating text in a particular subject matter domain. Thus, the large language model(s) may each be initially trained on a general text corpus, and optionally, fine-tuned using a training corpus that relates to a particular subject matter domain, such as the subject matter domain of a particular service or group of services that are offered by a same provider and/or relate to a same computing/networking task or set of tasks.

In some embodiments, message generation module 112 utilizes a two-step generation process for generating personalized messages in which a first trained machine learning model is used to generate an initial message based on the service description data, and a second machine learning model uses the initial message as a prompt to generate a customized message using the user profile data of each group of users as additional input. Thus, the second machine learning model may include a text-to-text transformer that personalizes messages for each group of users so that each personalized message includes features that relate to the interests, requirements, and the like of the group of users that are included in the service (as determined according to the service description data). This process is further depicted and described below with reference to FIG. 4.

Each personalized message may include details that describe the service, as well as other features such as an invitation to a knowledge session (which may include a collaborative communication session) and/or one or more hyperlinks to additional resources that describe the service or enable users to utilize the service. Once a personalized message is generated, the personalized message may be provided to the users of each group of users. In some embodiments, when groups of users are ranked by user analysis module 110, the messages may be generated and/or transmitted by message generation module 112 in an order according to the rank. Thus, the processing of messages is performed more efficiently by prioritizing users who are most likely to be interested in utilizing the service.

Feedback module 114 may collect feedback relating to the personalized messages that are provided to users and can process the feedback for use in calibrating the various components of the embodiments presented herein. The feedback may be collected from client devices 120A-120N and can include explicit and/or implicit user feedback. Explicit user feedback may be obtained by prompting users to provide feedback in the form of a free-text entry or multiple-choice survey. The prompt for explicit user feedback may ask a user to provide feedback indicating whether the user found the personalized message to be relevant to their interests, requirements, roles, and the like. Additionally or alternatively, the prompt may ask users whether the personalized message properly described the service.

The implicit user feedback that is collected may be based on user behavior, such as whether users read a personalized message, whether a user clicks in a hyperlink in a personalized message, whether a user mouses over or selects particular text in a personalized message, whether a user accepts an invitation to a knowledge session, a user's dwell time on a personalized message, and the like.

The explicit and/or implicit user feedback can be collected by client devices 120A-120N for further processing by generative server 102, which uses the feedback to refine various aspects of the generative model (e.g., one or more machine learning models) as well as the user profile data and/or the service description data.

Calibration module 116 provides the user feedback in order to refine various aspects, including using machine learning models and/or data (e.g., user profile data, service description data) to update the machine learning models, the user profile data, and/or the service description data. A large language model may process the feedback in combination with the service description data in order to refine the service description data to more accurately describe a service and/or to prioritize details in the service description that, as indicated by user feedback, is of interest to users. Additionally or alternatively, calibration module 116 may update one or more of the machine learning models described herein (e.g., by adjusting weights/parameters) in order to increase the accuracy of the machine learning model(s). In some embodiments, calibration module 116 uses the user feedback to update (e.g., add, remove, and/or edit) user profile data of each user, as the user feedback can indicate whether user interests, roles, requirements, etc., are accurate or have changed. The feedback-based calibration model is depicted and described in further detail below with reference to FIG. 5.

Database 118 may include any non-volatile storage media known in the art. For example, database 118 can be implemented with a tape library, optical library, one or more independent hard disk drives, or multiple hard disk drives in a redundant array of independent disks (RAID). Similarly, data in database 118 may conform to any suitable storage architecture known in the art, such as a file, a relational database, an object-oriented database, and/or one or more tables. Database 118 may store data including service description data of various services, user profile data of users who may use such services, and/or feedback data obtained from users, including historical interactions of users with regard to personalized messages.

Client devices 120A-120N may each include a network interface (I/F) 122, at least one processor (computer processor), and memory 126 (which stores instructions for a client module 128). In various embodiments, client devices 120A-120N may each include a rack-mounted server, laptop, desktop, smartphone, tablet, or any other programmable electronic device capable of executing computer readable program instructions. Network interface 122 enables components of each client device 120A-120N to send and receive data over a network, such as network 130. Client devices 120A-120N may each enable users to receive messages that are personalized in accordance with the embodiments presented herein in order to facilitate knowledge sessions.

Client module 128 may include one or more modules or units to perform various functions of the embodiments described below. Client module 128 may be implemented by any combination of any quantity of software and/or hardware modules or units, and may reside within memory 126 of any of client devices 120A-120N for execution by a processor, such as processor 124. Client module 128 may perform various operations to enable a user of each client device 120A-120N to receive and interact with personalized messages, including accepting invitations to join knowledge sessions and participating in the knowledge sessions. Client module 128 may enable a user to utilize service that are announced to the user via the personalized messages, including executing various computing and/or networking operations. Client module 128 may be configured to collect the feedback described herein from a user of each client device 120A-120N, including implicit and/or explicit user feedback.

Network 130 may include a local area network (LAN), a wide area network (WAN) such as the Internet, or a combination of the two, and includes wired, wireless, or fiber optic connections. In general, network 130 can be any combination of connections and protocols known in the art that will support communications between generative server 102 and client devices 120A-120N via their respective network interfaces in accordance with the described embodiments.

Figure 2:
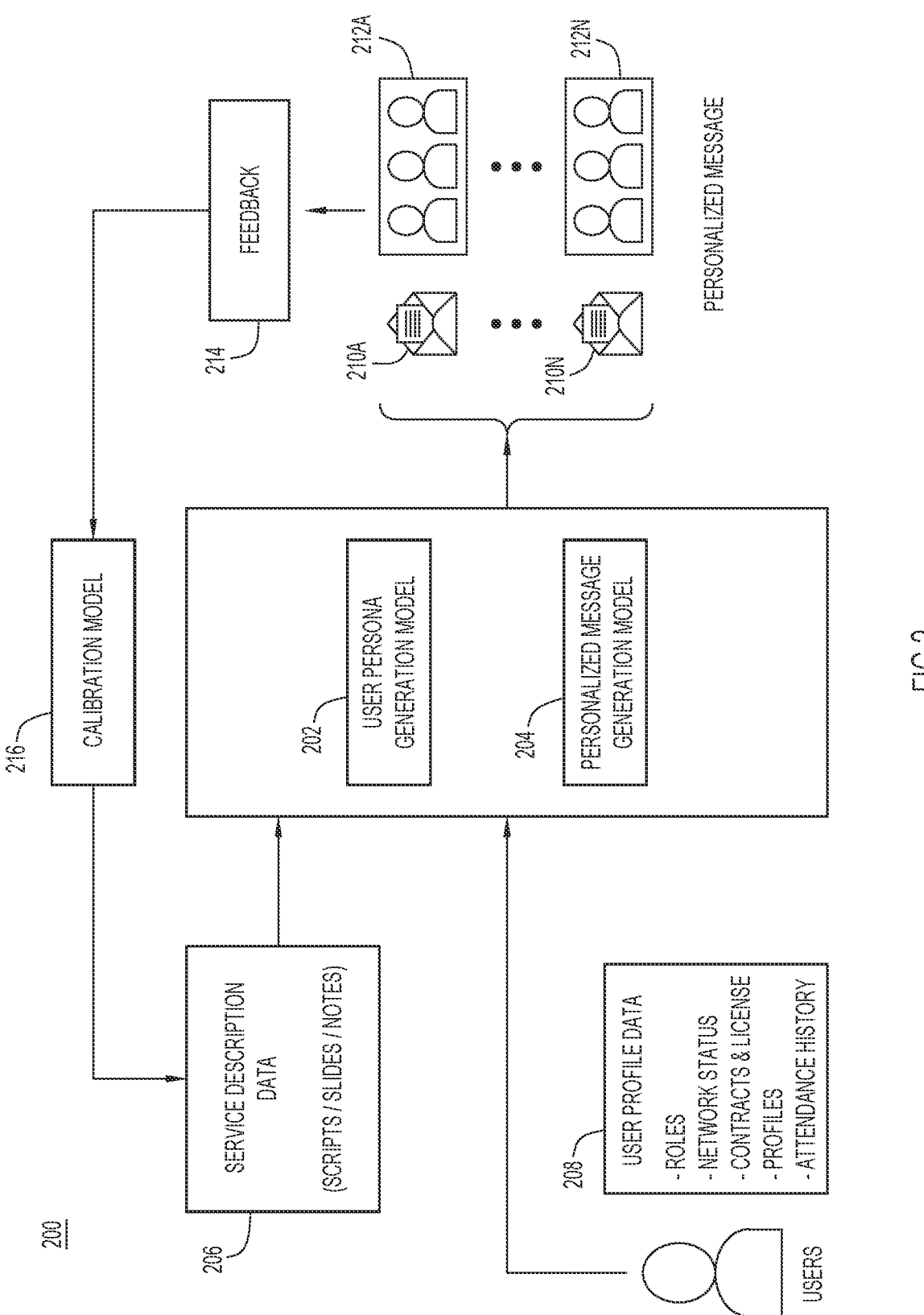
FIG. 2 is a flow diagram for a generative machine learning model that generates customized knowledge session content, according to an example embodiment.

FIG. 2 is a flow diagram for a generative machine learning model 200 that generates customized knowledge session content, according to an example embodiment. As depicted, generative machine learning model 200 includes a user persona generation model 202, a personalized message generation model 204, service description data 206, user profile data 208, personalized messages 210A-210N, user groups 212A-212N, feedback 214, and a calibration model 216.

The user persona generation model 202 may receive as input the service description data 206 and user profile data 208. Using a neural network machine learning model, user persona generation model may generate embeddings based on the user profile data and the service description data (which may include unstructured data that is pre-processed using a large language model), a vector space representation may be generated so that users can be assigned into groups by user persona generation model 202. The user profile data 208, which can include roles of users, network statuses, contracts and licenses associated with users, biographical profile data, attendance history (e.g., attendance to previous knowledge sessions), and the like, is analyzed using the generated embeddings to identify clusters of users who are similar in regard to their user profile data 208. Thus, users can be grouped accordingly.

Personalized message generation model 204 may receive as input the service description data 206 and user profile data 208. Personalized message generation model 204 may include one or more machine learning models, including generative models (e.g., large language models) and/or neural networks in order to generate messages that are personalized for users with regard to both the user profile data (which captures the users' interests and requirements), as well as the service description data. Personalized message generation model 204 may employ a two-step message generation approach in which a general large language model generates an initial message using the service description data, and then a tuned large language model processes the initial message and the user profile data as input to generate personalized messages 210A-210N for each user group 212A-212N.

The output of personalized message generation model 204 includes a plurality of personalized messages 210A-210N, with one message corresponding to each user group 212A-212N. The personalized messages 210A-210N are then provided to the users of each user group 212A-212N and based on the users' interactions and/or input, feedback 214 is collected for processing by calibration model 216.

Calibration model 216 may analyze the feedback in order to determine whether, and how, to modify any of the user profile data, the various machine learning models, and/or the service description data. In some embodiments, calibration model 216 may use a large language model to analyze the feedback in order to identify any capabilities or other aspects that a service lacks and that are desired by users. These capabilities or other aspects can be automatically added into the service in order to provide users with the requested features. For example, calibration model 216 can identify a particular code module, protocol, configuration setting, and the like, and add that capability to the service.

Figure 3:
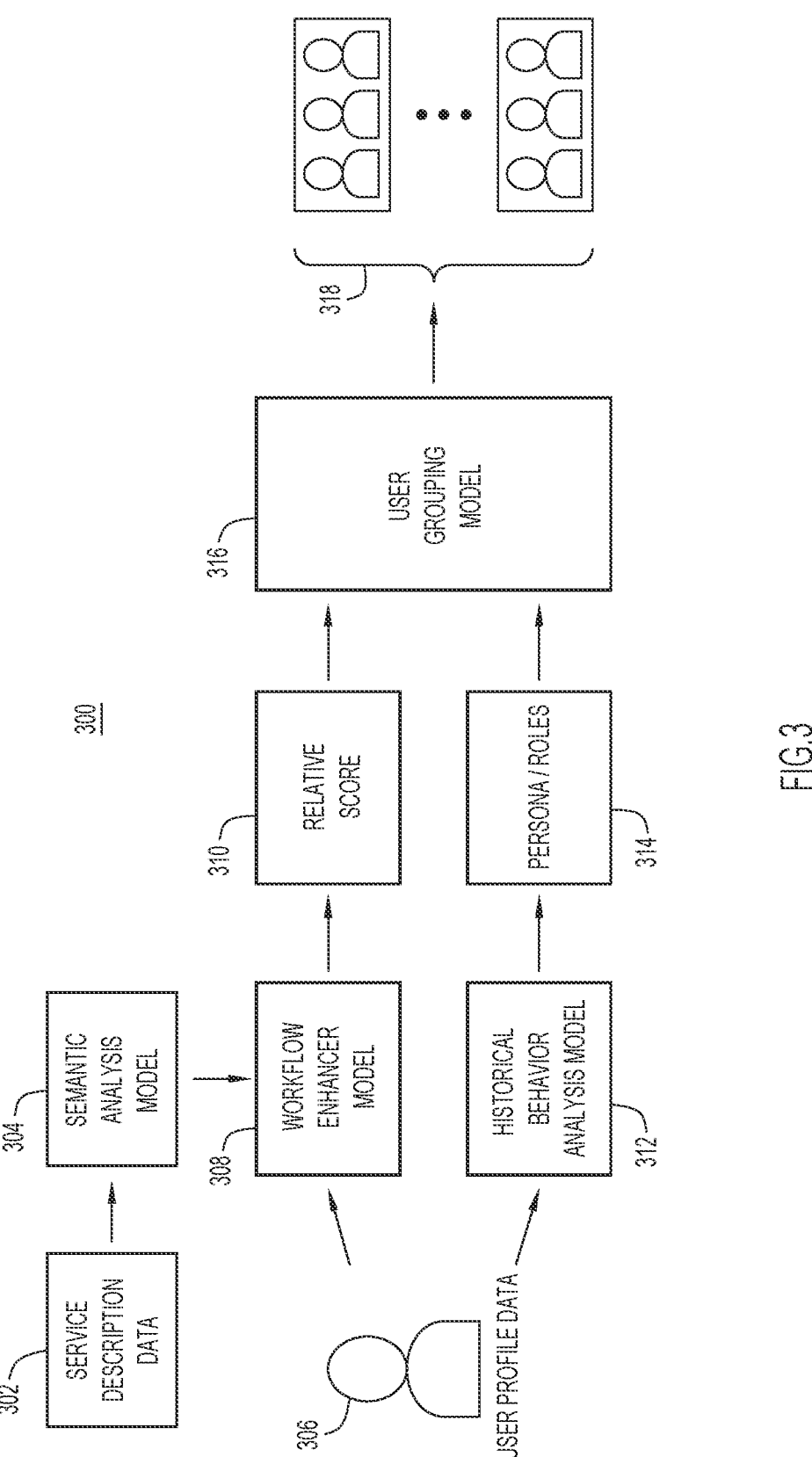
FIG. 3 is a flow diagram depicting a user persona generation model, according to an example embodiment.

FIG. 3 is a flow diagram depicting a user persona generation model 300, according to an example embodiment. As depicted, user persona generation model 300 includes a semantic analysis model 304, a workflow enhancement model 308, a historical behavior analysis model 312, and a user grouping model 316, each of which can be implemented using one or more machine learning models. User persona generation model 300 thus includes various machine learning components (each of which may be an independently-trained machine learning model) that analyze user profile data 306 in combination with service description data 302 in order to assign users into user groups 318.

The input data to user persona generation model 300 includes service description data 302 and user profile data 306. The service description data 302, which may include unstructured data describing features of a service, can be processed by semantic analysis model 304 in order to prepare the data for subsequent processing by the various machine learning models of user persona generation model 300. The service description data 302 may include any data descriptive of a service, including a software bill of materials, presentation documents, scripts, knowledge session agenda, and the like. Semantic analysis model 304 may include an encoder-decoder model (which can be implemented using a large language model) that is trained to transform unstructured service description data 302 into high-dimensional embeddings that can be used by the various other machine learning components of user persona generation model 300.

User profile data 306 may be processed by workflow enhancer model 308 and/or historical behavior analysis model 312. Workflow enhancer model 308 can include a neural network machine learning model that processes the output of semantic analysis model 304 as well as user profile data 306 in order to extract relevant topics and keywords that can be relevant to a knowledge session. Workflow enhancer model 308 may analyze the current service usage, subscriptions, and tasks of users to identify whether there are new or better contracts, licenses, or other services that can enhance each user's workflow. The neural network of workflow enhancer model 308 includes weights that may be assigned based on the urgency of pending tasks and the number of beneficial features that are offered by a service described by service description data 302. As output, workflow enhancer model 308 provides relative scores 310: higher scores may indicate that there is a higher likelihood that users can improve their workflow, based on their user profile data 306, by using the service described by service description data 302.

Historical behavior analysis model 312 may include an attention-based model that will analyze historical activity of users in the context of their roles in organizations. When analyzing users' historical use of services, historical behavior analysis model 312 may be configured to determine that a user frequently uses a feature when there is a high clickthrough rate on a feature described in a personalized message, a threshold amount of dwell time spent by a user on a feature described in a personalized message, and the like. Historical behavior analysis model 312 may analyze the data and determine, for each user, which features are important to them based on their usage; if significant updates or new functionalities are added to a frequently used feature, the user may thus be interested in it. Attention correlation may be calculated between the features in a service from the high-dimensional embeddings obtained from the service description data 302 and each user's frequently used features to predict the features of a service that users are most likely to be interested. Thus, historical behavior analysis model 312 can output personas/role data 314 that enables users to be assigned to groups based on each user's attention weights, which can be used to group users by user grouping model 316.

After obtaining the relative scores 310 for each user and the persona/roles data 314 from workflow enhancer model 308 and historical behavior analysis model 312, user grouping model 316 may group users based on the two inputs. The relative scores 310 may be used to rank users based on who will benefit the most from the service, and the persona/roles data 314 will enable grouping in a manner that is based on users' interest in different features of a service. User groups 318 may be assigned based on these two factors. User grouping model 316 may include a neural network or other deep learning model that is trained using historical examples of user persona/role data 314 and relevance scores 310 along with corresponding examples of user groups in order to group users accordingly.

Figure 4:
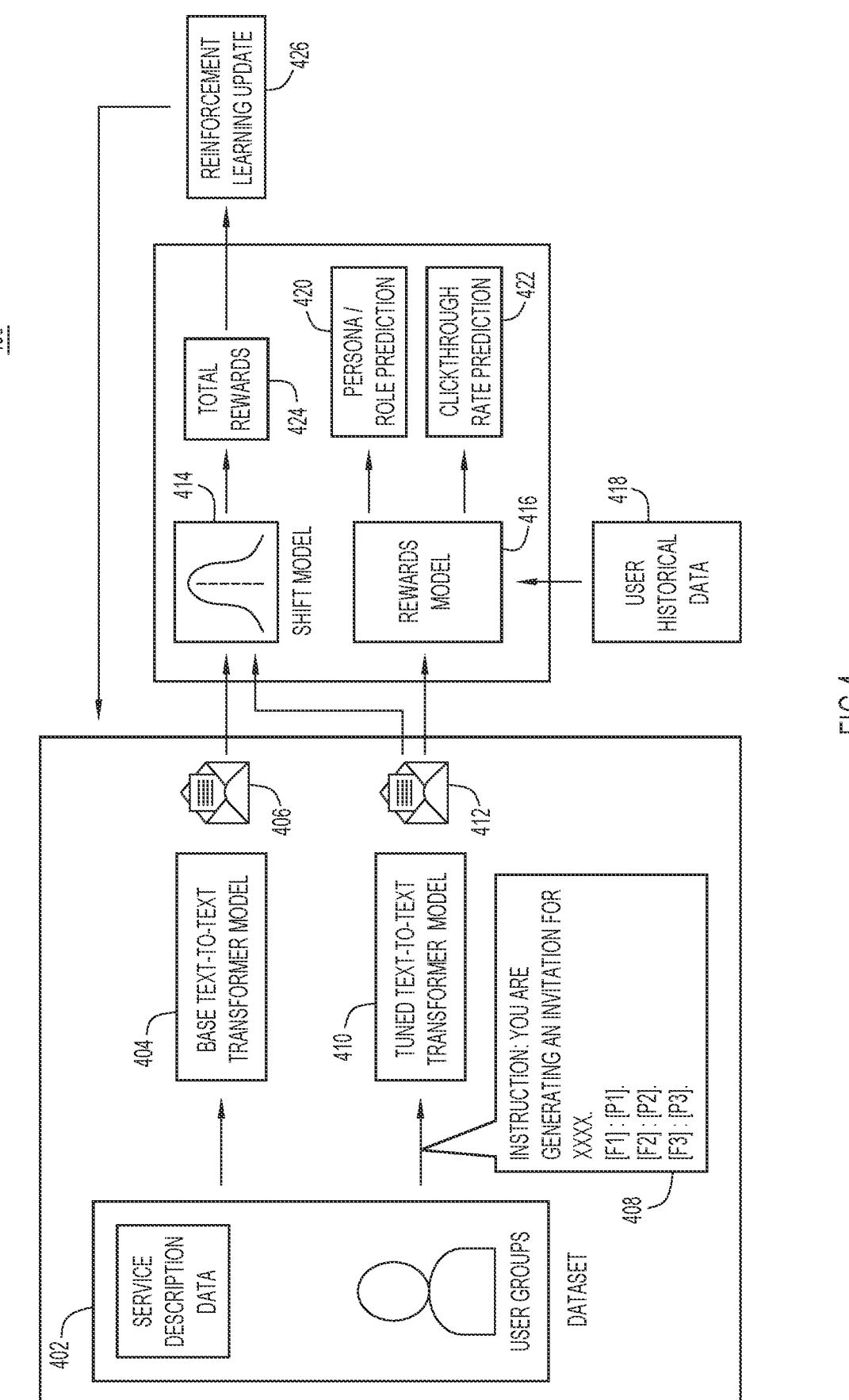
FIG. 4 is a block diagram depicting a personalized message generation model, according to an example embodiment.

With reference now to FIG. 4, a block diagram is shown depicting a personalized message generation model 400, according to an example embodiment, as depicted, personalized message generation model 400 includes a base text-to-text transformer model 404, a tuned text-to-text transformer model 410, a shift model 414, and a rewards model 416.

The input data 402 for personalized message generation model 400 includes service description data and user profile data. The service description data may include service educational materials (e.g., scripts, notes, and slides) and the user groups may be obtained from user persona generation model 300, as depicted and described with reference to FIG. 3. Rather than inputting tokenized raw text to a model, personalized message generation model 400 employs an instruction-based learning method to improve the generation of personalized messages. In particular, an instruction that includes a short text sample based on the user profile data is provided to the model in order to generate personalized messages in alignment with users' interests. A trigger token may be selected from keywords included in the service description data that align with user interests. Next, the instruction, pairs of raw texts, and trigger tokens are concatenated and passed into the transformer model to generate the invitation.

Two large-language text generation models are utilized in personalized message generation model 400: a base text-to-text transformer model 404, and a tuned text-to-text transformer model 410. Base text-to-text transformer model 404 may be a pre-trained model, whereas tuned text-to-text transformer model 410 may include a fine-tuned model that is tuned using a corpus of training text relating to a knowledge domain of the particular service. Base text-to-text transformer model 404 may be provided an instruction to generate an initial message based on the service description data; the message may be designed to elicit user engagement with the service by describing various features of the service. This output (e.g., initial message 406) can be provided to tuned text-to-text transformer model 410, along with instructions 408 describing how to generate a personalized message for each group of users. Each group of users may be described in instructions 408 according to a feature (e.g., "[F1]", "[F2]", etc.) in which the group may be interested, as well as particular user profile data for those users (e.g., "[P1]", "[P2]", etc.) that relate to those features. Tuned text-to-text transformer model 410 may generate as output a personalized message 412 for each group of users in which each message is accordingly personalized with respect to one or more features that align with aspects of those users' user profile data.

To ensure that tuned text-to-text transformer model 410 generates a message that is accurately personalized based on persona data and service description data, and to ensure that the personalized message does not greatly differ from the text distribution learned by the pre-trained base model, reinforcement learning is performed with two reward functions to update the weights of tuned text-to-text transformer model 410. A shift model 414 penalizes cases in which the distribution of text generated by tuned text-to-text transformer model 410 differs beyond a threshold amount from the distribution of text generated by base text-to-text transformer model 404. Thus, if the personalized message 412 differs beyond a threshold amount from the initial message 406, then weights of tuned text-to-text transformer model 410 are adjusted; this process can iterate until the personalized message 412 falls within a desired threshold level of similarity of initial message 406. Another reward function, rewards model 416, may include a neural network that applies a self-supervised learning approach to a regression model that is trained based on historical user data. The self-supervised approach with a regression model is trained to predict, based on the historical user data, the clickthrough rate of generated personalized messages 412 based on users' determined personas (e.g., the roles, interests, requirements, etc., extracted from their user profile data). The prediction of rewards model 416 measures how well the personalized message 412 generated by tuned text-to-text transformer model 410 is aligned with the input data 402. In reinforcement learning, an agent is rewarded for actions that lead to desired outcomes and a penalty for actions that lead to undesired outcomes. In the embodiments presented herein, the agent can learn to maximize reward by trial and error, iteratively improving the generation of personalized messages. Rewards model 416 may be provided with user historical data 418, which includes results of previous user interactions with messages relating to knowledge sessions. Thus, rewards model 416 can generate clickthrough rate predictions 422 as well as persona/role predictions 420 that predict which users are most likely to engage in a personalized message; these predictions are used to update tune text-to-text transformer model 410 via reinforced learning.

The total reward score 424 of a personalized message can be determined by combining the two reward functions described, including the distribution penalty score calculated according to the shift model 414 and the quality score from the rewards model 416, which the agent uses to update the parameters of the tuned text-to-text transformer model at operation 426.

Figure 5:
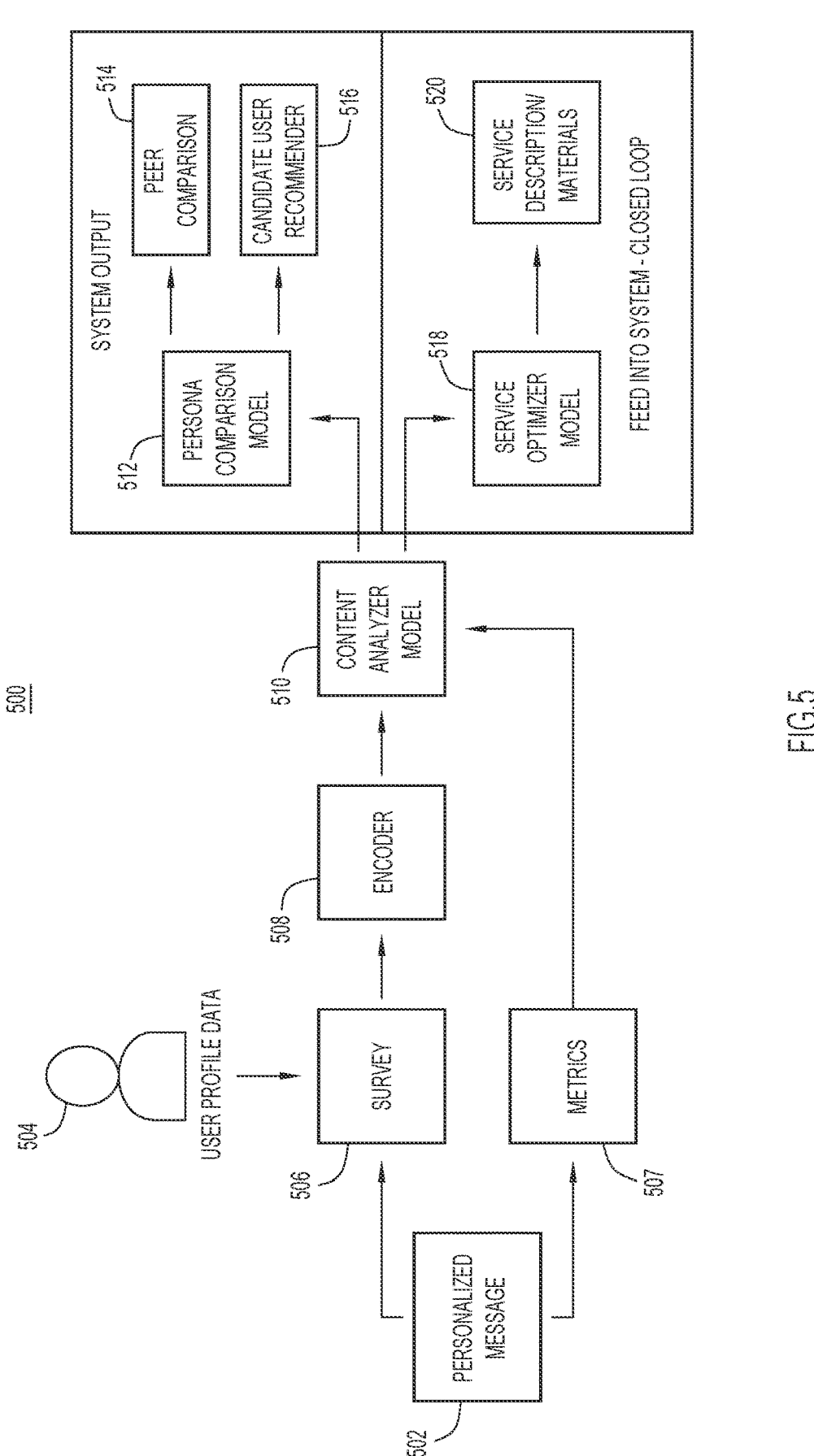
FIG. 5 is a flow diagram depicting a feedback-based calibration model, according to an example embodiment.

FIG. 5 is a flow diagram depicting a feedback-based calibration model 500, according to an example embodiment, as depicted, calibration model 500 includes an encoder 508, a content analyzer model 510, a persona comparison model 512, and a service optimizer model 518.

After the personalized messages 502 are sent and users attend knowledge sessions to learn about the new service or features thereof, feedback will be obtained from the users through post-offering surveys. The post-offering surveys can contain questions regarding the users' satisfaction with the service. Once users complete the survey, this will be input into the system along with metrics that were tracked when offering the service to the user. The survey may be based on user profile data 504 so that different users are provided with different prompts according to the interests of those users. Examples of metrics that are tracked include sections of the service description or knowledge session in which the attendee users are engaged, mouse movements throughout observing the service, and the like. These example inputs will help track which part of the offering users find engaging.

Initially, when a personalized message 502 is transmitted to users, feedback may be collected in the form of explicit feedback 506 (e.g., survey results) and implicit feedback 507 (e.g., engagement metrics). The explicit feedback 506 can be fed into encoder 508, which may include a large-language model, in order to convert unstructured explicit feedback data into a form that is suitable for analysis by content analyzer model 510. Thus, embeddings may be obtained for both the explicit feedback 506 and implicit feedback 507, which are analyzed by a neural network component of content analyzer model 510 to identify any positive or negative feedback relating to features of the service, as well as to identify sentiment information.

The sentiment of the users may be provided to persona comparison model 512 and service optimizer model 518. In addition, persona comparison model 512 may use as input the sentiment information from content analyzer model 510 to analyze the users within each group. Based on the analysis, persona comparison model 512 employs a neural network that is trained to identify patterns and traits from users in each group and identify potential future candidates to generate personalized messages regarding a service. Thus, persona comparison model 512 generates a feedback loop within the entire end-to-end pipeline in order to identify additional candidate users 516 for a service. In addition, another output from persona comparison model 512 may include peer comparisons 514 which includes comparisons between a particular user and other users within the same group. The details that can be included in peer comparisons 514 can include time and other savings that can be realized by integrating the new service into a particular user's workflow.

Service optimizer model 518 may include one or more natural language processing models that receive as input service description data and generate an improved description of service based on the information from content analyzer model 510. If there is negative feedback for certain aspects of a service, service optimizer model 518 can make changes to the service description data and/or make changes to the features that are included in a service itself in order to improve user engagement. For example, service optimizer model 518 may access a library of code modules that can be included into a service based on feedback from users. Thus, service description/materials 520 can be output which includes a modified description of a service and/or a modified service itself.

Figure 6:
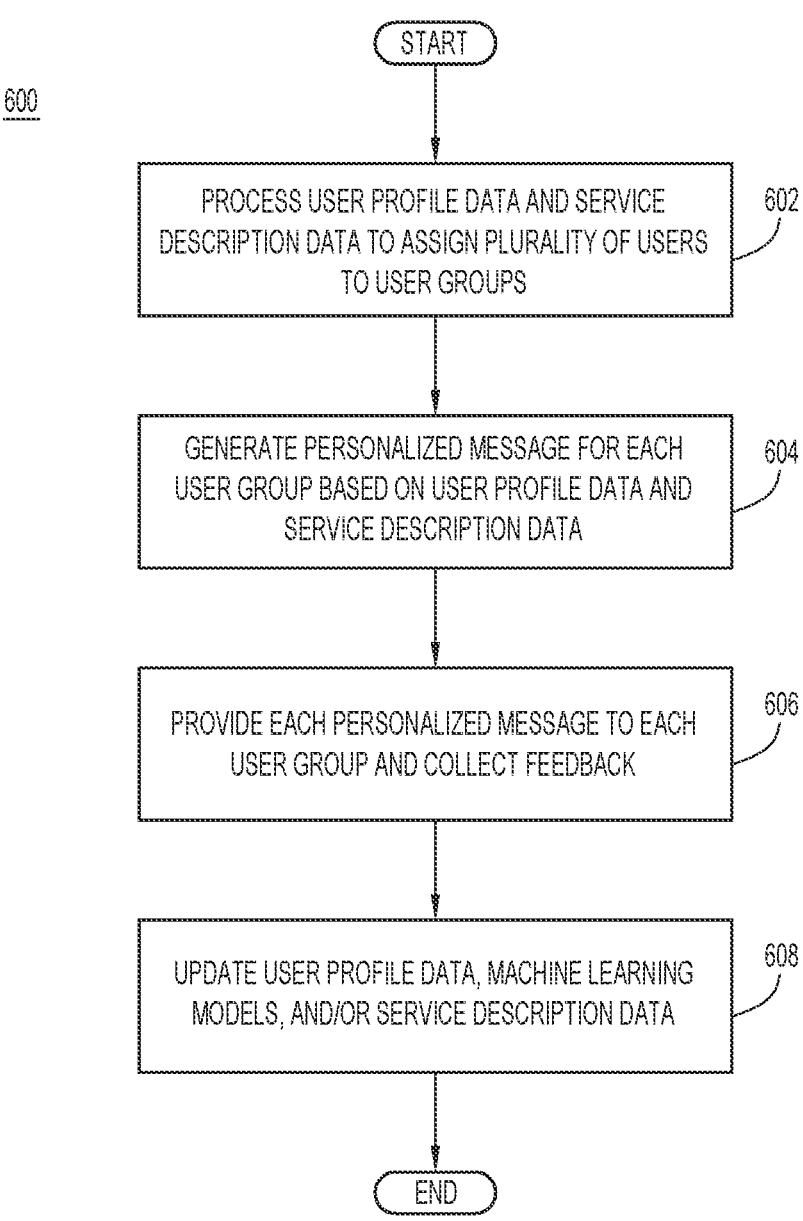
FIG. 6 is a flow chart of a method for generating personalized knowledge session content, according to an example embodiment.

FIG. 6 is a flow chart of a method 600 for generating personalized knowledge session content, according to an example embodiment.

User profile data and service description data is processed to assign a plurality of users to user groups at operation 602. One or more machine learning models may be trained and applied to process user profile data in combination with service description data in order to assign users to groups.

The user profile data and the service description data are processed to generate embeddings in a vector space representation. A machine learning model (e.g., a neural network or other model) can be applied to perform semantic analysis using the embeddings of the service description data in combination with the embeddings of the user profile data in order to assign users into groups based on similarities between the users (as determined according to the embeddings of the user profile data). Thus, each group may contain users who are likely to share similar interests, requirements, and other similarities in terms of interest in features that are included in a service.

A personalized message is generated for each user group based on the user profile data and the service description data at operation 604. One or more machine learning models, including large language models, may be employed to generate messages that are personalized with respect to each group of users. A first large language model may generate an initial message based on the service description data, and a second large language model, which is tuned using training data from a particular knowledge domain relating to the service, may generate personalized messages that also take as input the user profile data for each group of users. Thus, the personalized messages may be different from each group of users, and can include features that each given group in which the users of that group have demonstrated an interest (according to their user profile data). The personalized message can be compared to the initial message using a shift penalty model to ensure that the personalized message does not differ from the initial message by a threshold amount. Additionally or alternatively, the personalized message can be analyzed with a rewards model that determines, based on historical user engagement data, a likelihood that the personalized message will generate user engagement. Thus, if a personalized message satisfies the threshold criteria for both the drift model and the rewards model, the personalized message can be provided to users of a group.

Each personalized message is provided to each user group and feedback is collected at operation 606. The personalized message can be transmitted via a messaging application, email, and the like, and may include a description of a service, a knowledge session regarding a service, and hyperlinks or other links to resources so that a user can learn more about a service or join a knowledge session. Feedback can be collected by each user device in the form of implicit and/or explicit feedback. For implicit feedback, a user may provide text describing the user's reaction to the personalized message and the service described therein, whereas explicit feedback may include details such as user dwell time on a message or portions thereof, user clickthrough rates of links included in a message, and the like.

User profile data, machine learning models, and/or service description data is updated based on the collected feedback at operation 608. One or more machine learning models, including neural network models, can analyze positive and negative user feedback to identify whether features of a service are liked or disliked, respectively, by users. The features that receive positive feedback can be expanded upon by generating a service description that focuses more on those features, providing additional details about those features and the like. Similarly, service description data can be modified to reduce the discussion of features that receive negative feedback. Additionally or alternatively, user profile data can be updated to more accurately reflect the users' interests, requirements, and the like. For example, if a user indicates that a feature is important and that feature is not listed as a requirement in that user's user profile data, the feature can be added as a requirement to the user's user profile data. Additionally or alternatively, the components of a service can be updated to include or exclude particular components based on the user feedback. In some embodiments, one or more of the machine learning models employed herein may be updated based on the user feedback in order to adjust weights of the models so that each model can perform its trained task in a more accurate manner.

Figure 7:
FIG. 7 is a block diagram of a device that may be configured to perform operations relating to generating customized knowledge session content, as presented herein.

Referring now to FIG. 7, FIG. 7 illustrates a hardware block diagram of a computing device 700 that may perform functions associated with operations discussed herein in connection with the techniques depicted in FIGS. 1-6. In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O 714 allow for input and output of data and/or information with other entities that may be connected to computing device 700. For example, I/O 714 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: processing user profile data of a plurality of users and service description data that is descriptive of a service to assign the plurality of users to a plurality of user groups; generating a personalized message for each user group based on the user profile data and the service description data, wherein the personalized message is generated using one or more machine learning models; providing each personalized message to each user group and collecting feedback data based on the providing of each personalized message; and based on analyzing of the feedback data, updating one or more of: the user profile data, the one or more machine learning models, and the service description data.

In some aspects, the techniques described herein relate to a computer-implemented method, wherein generating the personalized message includes: generating an initial message, based on the service description data, using a first machine learning model; and generating the personalized message, using a second machine learning model, based on the initial message and the user profile data.

In some aspects, the techniques described herein relate to a computer-implemented method, wherein the second machine learning model includes a text-to-text transformer that is updated using the feedback data.

In some aspects, the techniques described herein relate to a computer-implemented method, wherein generating the personalized message includes comparing the personalized message to the initial message to determine that the personalized message does not differ from the initial message by a threshold amount.

In some aspects, the techniques described herein relate to a computer-implemented method, wherein each personalized message indicates particular features of the service that are selected based on the user profile data for each user group for which each personalized message is generated.

In some aspects, the techniques described herein relate to a computer-implemented method, wherein the user profile data includes historical user behavior, contracts and licenses associated with the plurality of users, and usage of particular services by the plurality of users.

In some aspects, the techniques described herein relate to a computer-implemented method, wherein the feedback data includes one or more of: explicit feedback data provided by one or more users of the plurality of users, and implicit feedback data that is collected based on interactions by one or more users of the plurality of users with the personalized message.

In some aspects, the techniques described herein relate to a computer-implemented method, wherein the implicit feedback data includes interaction data that is descriptive of interactions of one or more users of the plurality of users interacted with descriptions of particular features of the service.

In some aspects, the techniques described herein relate to a system including: one or more computer processors; one or more computer readable storage media; and program instructions stored on the one or more computer readable storage media for execution by at least one of the one or more computer processors, the program instructions including instructions to: processing user profile data of a plurality of users and service description data that is descriptive of a service to assign the plurality of users to a plurality of user groups; generating a personalized message for each user group based on the user profile data and the service description data, wherein the personalized message is generated using one or more machine learning models; providing each personalized message to each user group and collecting feedback data based on the providing of each personalized message; and based on analyzing of the feedback data, updating one or more of: the user profile data, the one or more machine learning models, and the service description data.

In some aspects, the techniques described herein relate to a system, wherein the instructions for generating the personalized message include instructions to: generate an initial message, based on the service description data, using a first machine learning model; and generate the personalized message, using a second machine learning model, based on the initial message and the user profile data.

In some aspects, the techniques described herein relate to a system, wherein the second machine learning model includes a text-to-text transformer that is updated using the feedback data.

In some aspects, the techniques described herein relate to a system, wherein generating the personalized message includes comparing the personalized message to the initial message to determine that the personalized message does not differ from the initial message by a threshold amount.

In some aspects, the techniques described herein relate to a system, wherein each personalized message indicates particular features of the service that are selected based on the user profile data for each user group for which each personalized message is generated.

In some aspects, the techniques described herein relate to a system, wherein the user profile data includes historical user behavior, contracts and licenses associated with the plurality of users, and usage of particular services by the plurality of users.

In some aspects, the techniques described herein relate to a system, wherein the feedback data includes one or more of:

explicit feedback data provided by one or more users of the plurality of users, and implicit feedback data that is collected based on interactions by one or more users of the plurality of users with the personalized message.

In some aspects, the techniques described herein relate to a system, wherein the implicit feedback data includes interaction data that is descriptive of interactions of one or more users of the plurality of users interacted with descriptions of particular features of the service.

In some aspects, the techniques described herein relate to one or more non-transitory computer readable storage media having program instructions embodied therewith, the program instructions executable by a computer to cause the computer to perform operations including: processing user profile data of a plurality of users and service description data that is descriptive of a service to assign the plurality of users to a plurality of user groups; generating a personalized message for each user group based on the user profile data and the service description data, wherein the personalized message is generated using one or more machine learning models; providing each personalized message to each user group and collecting feedback data based on the providing of each personalized message; and based on analyzing of the feedback data, updating one or more of: the user profile data, the one or more machine learning models, and the service description data.

In some aspects, the techniques described herein relate to one or more non-transitory computer readable storage media, wherein the program instructions for generating the personalized message further cause the computer to: generate an initial message, based on the service description data, using a first machine learning model; and generate the personalized message, using a second machine learning model, based on the initial message and the user profile data.

In some aspects, the techniques described herein relate to one or more non-transitory computer readable storage media, wherein the second machine learning model includes a text-to-text transformer that is updated using the feedback data.

In some aspects, the techniques described herein relate to one or more non-transitory computer readable storage media, wherein generating the personalized message includes comparing the personalized message to the initial message to determine that the personalized message does not differ from the initial message by a threshold amount.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
processing user profile data of a plurality of users and service description data that is descriptive of a service;
assigning, based on the user profile data and the service description data, the plurality of users to a plurality of user groups;
generating a personalized message for each user group based on the user profile data and the service description data, wherein the personalized message is generated using one or more machine learning models;

providing each personalized message to each user group and collecting feedback data based on the providing of each personalized message;
analyzing, using a calibration model, the feedback data to identify one or more capabilities that are lacking in the service, wherein the one or more capabilities include a code module, a protocol, or a configuration setting; and
adding the one or more capabilities to the service.

2. The computer-implemented method of claim 1, wherein generating the personalized message comprises:
generating an initial message, based on the service description data, using a first machine learning model; and
generating the personalized message, using a second machine learning model, based on the initial message and the user profile data.

3. The computer-implemented method of claim 2, wherein the second machine learning model comprises a text-to-text transformer that is updated using the feedback data.

4. The computer-implemented method of claim 2, wherein generating the personalized message comprises comparing the personalized message to the initial message to determine that the personalized message does not differ from the initial message by a threshold amount.

5. The computer-implemented method of claim 1, wherein each personalized message indicates particular features of the service that are selected based on the user profile data for each user group for which each personalized message is generated.

6. The computer-implemented method of claim 1, wherein the user profile data includes historical user behavior, contracts and licenses associated with the plurality of users, and usage of particular services by the plurality of users.

7. The computer-implemented method of claim 1, wherein the feedback data includes one or more of: explicit feedback data provided by one or more users of the plurality of users, and implicit feedback data that is collected based on interactions by one or more users of the plurality of users with the personalized message, and wherein the calibration model is configured to use a large language model to identify the one or more capabilities.

8. The computer-implemented method of claim 7, wherein the implicit feedback data includes interaction data that is descriptive of interactions of one or more users of the plurality of users interacted with descriptions of particular features of the service.

9. A system comprising:
one or more computer processors;
one or more computer readable storage media; and
program instructions stored on the one or more computer readable storage media for execution by at least one of the one or more computer processors, the program instructions comprising instructions to:
processing user profile data of a plurality of users and service description data that is descriptive of a service;
assigning, based on the user profile data and the service description data, the plurality of users to a plurality of user groups;
generating a personalized message for each user group based on the user profile data and the service description data, wherein the personalized message is generated using one or more machine learning models;

providing each personalized message to each user group and collecting feedback data based on the providing of each personalized message;

analyzing, using a calibration model, the feedback data to identify one or more capabilities that are lacking in the service, wherein the one or more capabilities include a code module, a protocol, or a configuration setting; and adding the one or more capabilities to the service.

10. The system of claim 9, wherein the instructions for generating the personalized message comprise instructions to:

generate an initial message, based on the service description data, using a first machine learning model; and generate the personalized message, using a second machine learning model, based on the initial message and the user profile data.

11. The system of claim 10, wherein the second machine learning model comprises a text-to-text transformer that is updated using the feedback data.

12. The system of claim 10, wherein generating the personalized message comprises comparing the personalized message to the initial message to determine that the personalized message does not differ from the initial message by a threshold amount.

13. The system of claim 9, wherein each personalized message indicates particular features of the service that are selected based on the user profile data for each user group for which each personalized message is generated.

14. The system of claim 9, wherein the user profile data includes historical user behavior, contracts and licenses associated with the plurality of users, and usage of particular services by the plurality of users.

15. The system of claim 9, wherein the feedback data includes one or more of: explicit feedback data provided by one or more users of the plurality of users, and implicit feedback data that is collected based on interactions by one or more users of the plurality of users with the personalized message, and wherein the calibration model is configured to use a large language model to identify the one or more capabilities.

16. The system of claim 15, wherein the implicit feedback data includes interaction data that is descriptive of interactions of one or more users of the plurality of users interacted with descriptions of particular features of the service.

17. One or more non-transitory computer readable storage media having program instructions embodied therewith, the program instructions executable by a computer to cause the computer to perform operations including:

processing user profile data of a plurality of users and service description data that is descriptive of a service;

assigning, based on the user profile data and the service description data, the plurality of users to a plurality of user groups;

generating a personalized message for each user group based on the user profile data and the service description data, wherein the personalized message is generated using one or more machine learning models;

providing each personalized message to each user group and collecting feedback data based on the providing of each personalized message;

analyzing, using a calibration model, the feedback data to identify one or more capabilities that are lacking in the service, wherein the one or more capabilities include a code module, a protocol, or a configuration setting; and adding the one or more capabilities to the service.

18. The one or more non-transitory computer readable storage media of claim 17, wherein the program instructions for generating the personalized message further cause the computer to:

generate an initial message, based on the service description data, using a first machine learning model; and generate the personalized message, using a second machine learning model, based on the initial message and the user profile data.

19. The one or more non-transitory computer readable storage media of claim 18, wherein the second machine learning model comprises a text-to-text transformer that is updated using the feedback data.

20. The one or more non-transitory computer readable storage media of claim 18, wherein generating the personalized message comprises comparing the personalized message to the initial message to determine that the personalized message does not differ from the initial message by a threshold amount.

* * * * *